(12) United States Patent
Thompson

(10) Patent No.: US 11,597,282 B1
(45) Date of Patent: Mar. 7, 2023

(54) CLOSED-LOOP CONTROL OF VEHICLE SPEED

(71) Applicant: Parker-Hannifin Corporation, Cleveland, OH (US)

(72) Inventor: Randall Thompson, Landcaster, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 149 days.

(21) Appl. No.: 17/207,873

(22) Filed: Mar. 22, 2021

Related U.S. Application Data

(60) Provisional application No. 63/006,510, filed on Apr. 7, 2020.

(51) Int. Cl.
*B60L 15/20* (2006.01)
*B60L 3/00* (2019.01)

(52) U.S. Cl.
CPC ............. *B60L 15/20* (2013.01); *B60L 3/0061* (2013.01); *B60L 2220/46* (2013.01); *B60L 2240/24* (2013.01); *B60L 2240/421* (2013.01); *B60L 2240/461* (2013.01)

(58) Field of Classification Search
CPC .... B60L 15/20; B60L 3/0061; B60L 2220/46; B60L 2240/24; B60L 2240/421; B60L 2240/461
See application file for complete search history.

(56) References Cited

U.S. PATENT DOCUMENTS

| 6,538,426 | B1 | 3/2003 | Enrietto et al. |
| 8,449,424 | B2 | 5/2013 | Schoon |
| 8,863,885 | B2 | 10/2014 | Dagh et al. |
| 9,499,199 | B1 * | 11/2016 | Laymon ............... A01D 69/025 |
| 9,586,471 | B2 | 3/2017 | Gillett |
| 2012/0159916 | A1 | 6/2012 | Ishii et al. |

FOREIGN PATENT DOCUMENTS

| DE | 10153400 A1 | 7/2002 | |
| DE | 102009026915 A1 * | 12/2010 | ............... B60K 6/46 |

OTHER PUBLICATIONS

Wu et al.; Differential Speed Steering Control for Four-Wheel Independent Driving Electric Vehicle; 2013 IEEE Intl. Sym. on Industrial Electronics; pp. 1-6 (Year: 2013).*

* cited by examiner

*Primary Examiner* — Michael J Zanelli
(74) *Attorney, Agent, or Firm* — McDonnell Boehnen Hulbert & Berghoff LLP

(57) ABSTRACT

A vehicle includes at least one wheel hub, a wheel hub speed sensor, and a controller. The wheel hub is configured to be coupled to a drive wheel. The wheel hub speed sensor is proximate to the wheel hub and is configured to generate a wheel hub speed signal that facilitates determination of a rate and direction of rotation of the wheel hub. The controller is configured to communicate power to a motor assembly coupled to the wheel hub to rotate the wheel hub at a particular rate and in a particular direction. The particular rate and the particular direction are associated with a particular position of a plurality of positions of a steering control.

20 Claims, 6 Drawing Sheets

CLOSED-LOOP CONTROL OF VEHICLE SPEED

RELATED DISCLOSURE

This application claims priority to U.S. Provisional Patent Application No. 63/006,510, filed on Apr. 7, 2020, the content of which is hereby incorporated by reference in its entirety.

BACKGROUND

Field

This application generally relates to vehicles such as zero turning radius (ZTR) vehicles. In particular, this application describes a method and system for performing closed-loop control of the speed of a vehicle.

Description of Related Art

Certain vehicles such as zero turning radius vehicles utilize a steering control, such as a pair of control levers, to control the speed and direction of the drive wheels of the vehicle. For example, a left control lever may control the speed and direction of a left drive wheel, and a right control lever may control the speed and direction of a right drive wheel.

Such vehicles can utilize hydraulic or electric motors to drive the wheels. In the case of hydraulic motors, a combustion engine may turn a hydraulic pump that, in turn, provides hydraulic fluid under pressure to a hydrostatic transmission. The hydrostatic transmission redirects the hydraulic fluid to the hydraulic motors responsive to the position of the control levers. In the case of electric motors, the vehicle can include a battery, and energy can be delivered from the battery to the motor responsive to the position of the control levers.

SUMMARY

In a first aspect, a vehicle includes a wheel hub, a wheel hub speed sensor, and a controller. The wheel hub is configured to be coupled to a drive wheel. The wheel hub speed sensor is proximate to the wheel hub and is configured to generate a wheel hub speed signal that facilitates determination of a rate and direction of rotation of the wheel hub. The controller is configured to communicate power to a motor assembly coupled to the wheel hub to rotate the wheel hub at a particular rate and in a particular direction. The particular rate and the particular direction are associated with a particular position of a plurality of positions of a steering control.

In a second aspect, a drive system for a vehicle includes a motor assembly, a wheel hub speed sensor, and a controller. The motor assembly is configured to be coupled to a wheel hub. The wheel hub speed sensor is configured to be proximate to the wheel hub and is configured to generate a wheel hub speed signal that facilitates determination of a rate and direction of rotation of the wheel hub. The controller is configured to communicate power to the motor assembly to rotate the wheel hub at a particular rate and in a particular direction. The particular rate and the particular direction are associated with a particular position of a plurality of positions of a steering control.

In a third aspect, a method for operating a vehicle includes generating, by a wheel hub speed sensor proximate a wheel hub, a wheel hub speed signal that facilitates determination of a rate and direction of rotation of the wheel hub. The method further includes communicating, by a controller in communication with the wheel hub speed sensor, power to a motor assembly coupled to the wheel hub to rotate the wheel hub at a particular rate and in a particular direction. The particular rate and the particular direction are associated with a particular position of a plurality of positions of a steering control.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
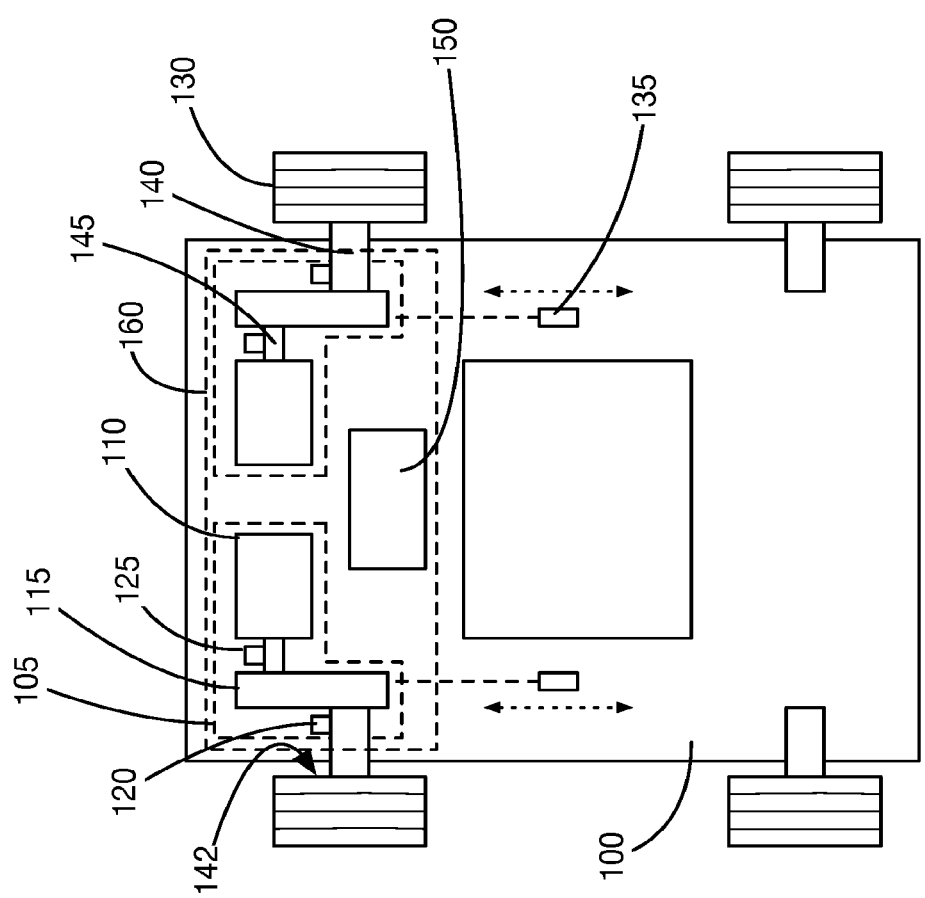
FIG. 1 illustrates a vehicle, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

I. Introduction

As noted above, certain types of vehicles can utilize hydraulic or electric motors to drive the drive wheels of the vehicle. The motors turn the drive wheels of the vehicle responsive to the position of a steering control such as a pair of control levers, a steering wheel, a stick control, etc. In some cases, the vehicle can include a drive system that receives position signals from the steering control and controls the motors based on the position signals.

As noted above, in the case of electric motors, the position of the steering control can be used to control the amount of energy delivered to the motors. When such an equipped vehicle is traveling on relatively level terrain, controlling the speed and direction of the vehicle is relatively effortless. For example, a pair of control levers (one to control the speed of each drive wheel) can be moved to a center position to cause the vehicle to travel in a relatively straight path because both wheels will spin at about the same rate. However, when traveling on uneven terrain, uneven loading on the vehicle can cause the drive wheels to spin at different rates even though the control levers are in identical positions. This necessitates operator intervention to maintain the direction of the vehicle, which can be cumbersome.

These problems are overcome by the examples described below. In the examples, wheel speed sensors can be arranged proximate to the wheel hubs of the vehicle to facilitate determining the speed of the wheel hubs and, therefore, the speed of the vehicle. A controller can control power to electric motors driving the wheel hubs to rotate the drive wheels at particular rates based on the position of the steering control of the vehicle. The controller can dynamically adjust the power delivered to the motors to maintain the rate of rotation of the wheel hubs at the rate of rotation desired by the operator, as indicated by the position of the steering control.

FIG. 1 illustrates an example of a vehicle 100. The vehicle 100 can correspond to a zero turning radius (ZTR) vehicle 100 or similar vehicle 100 capable of performing precise movements. The vehicle 100 includes a wheel hub 142, a wheel hub speed sensor 120, and a controller 150. As described in more detail below, the wheel hub 142 is configured to be coupled to a drive wheel 130 of the vehicle 100. The wheel hub speed sensor 120 is arranged proximate to the wheel hub 142 and is configured to generate a wheel hub speed signal that facilitates determination of a rate and direction of rotation of the wheel hub 142. The controller is configured to communicate power to a motor assembly 105 coupled to the wheel hub 142 to rotate the wheel hub 142 at a particular rate and in a particular direction. The particular rate and the particular direction are associated with a particular position of a plurality of positions of a steering control 135 (e.g., lap bar(s), steering wheel). The motor assembly, wheel hub speed sensor, and controller correspond to the drive system 160 of the vehicle.

An example of the vehicle 100 can include a second wheel hub 142, a second motor assembly 105, a second wheel hub speed sensor 120, and a second steering control 135.

An example of the motor assembly 105 can include a motor 110 and a transmission 115. The motor 110 can correspond to an induction motor (i.e., a brushless motor), where rotor windings of the motor 110 are electrically isolated from stator windings of the motor 110. In this regard, AC power can be supplied to the stator windings to create a magnetic field that rotates in synchronism with the AC oscillations. The rotating magnetic field induces an opposing current in the rotor windings. The induced current in the rotor windings, in turn, creates a magnetic field in the rotor that reacts against the magnetic field of the stator windings to cause the rotor to rotate. The motor 110 can include a motor output shaft 145, and the motor output shaft 145 can be coupled to the rotor to facilitate transferring mechanical energy of the motor 110 to the transmission 115.

The transmission 115 can correspond to a gearbox. In this regard, the transmission 115 can include a group of gears configured to multiply the torque produced by the motor 110. For example, the transmission 115 can multiply the torque by a predetermined number or fraction of a number. In this regard, a first gear may be coupled to the motor output shaft 145 of the motor 110. A second gear can be coupled to a transmission output shaft 140 of the transmission 115. Various intermediate gears can be arranged between the first and the second gears to transfer mechanical energy of motor output shaft 145 to the transmission output shaft 140. In an example, the rotation rate of the transmission output shaft 140 can be ¼ the rotation rate of the motor output shaft 145. The ratio of rotation rate of the transmission output shaft 140 to the rotation rate of the motor output shaft 145 can be different.

Figure 2:
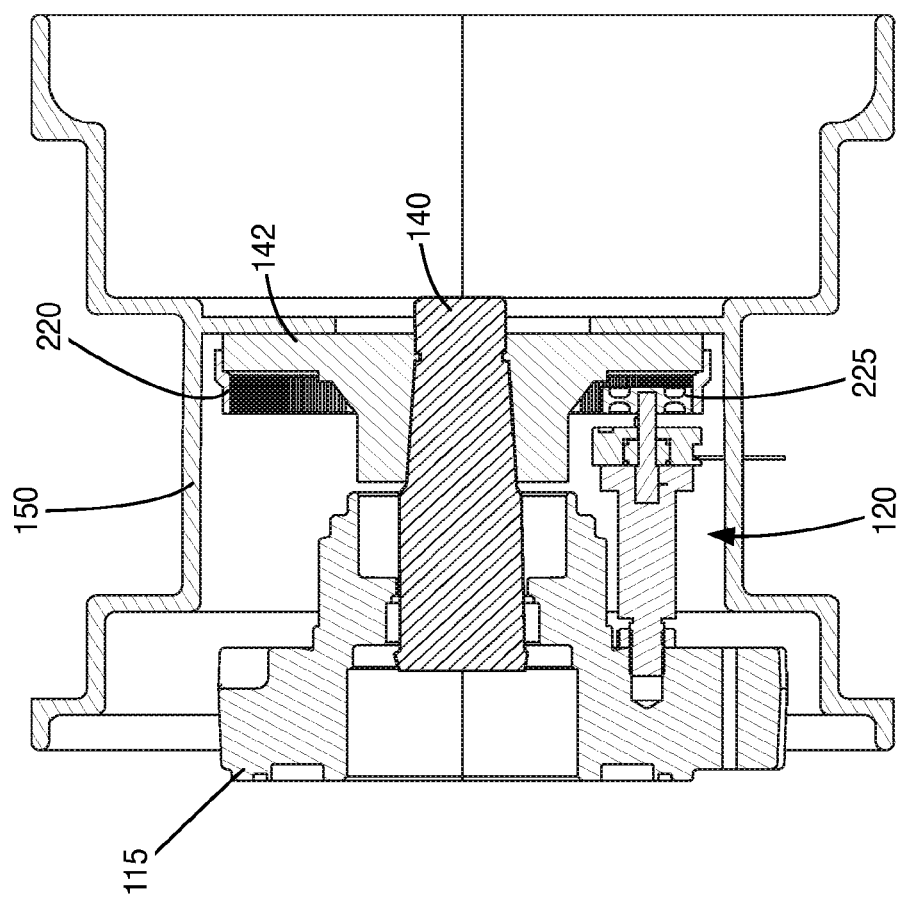
FIG. 2 illustrates a wheel hub speed sensor, in accordance with an example.

The motor assembly 105 is coupled to a wheel hub (142, FIG. 2). An example of the wheel hub 142 can be coupled to the output shaft of the transmission 115 and can be removably coupled to a drive wheel 130. The drive wheel 130 can correspond to a wheel utilized on a vehicle 100, such as a ZTR vehicle. For example, the drive wheel 130 can include a rim and a tire (not shown) arranged on the rim. The rim can be formed from a metal material or other material suitable to support the weight of, for example, a ZTR vehicle. The tire can be formed from a rubber material and can be inflatable. In some examples, an inner tube (not shown) can be provided within the tire to inflate the tire.

The wheel hub 142 can include a group of threaded lugs (not shown) that are configured to pass through openings in the drive wheel 130 configured to receive the threaded lugs. Lug nuts can be arranged and tightened onto the lugs to fasten the drive wheel 130 to the wheel hub 142. Alternatively, the wheel hub 142 can define a group of threaded openings. Threaded lugs (not shown) can be inserted through openings in the drive wheel 130 configured to align with the threaded openings of the wheel hub 142 to fasten the drive wheel 130 to the wheel hub 142.

The wheel hub speed sensor 120 is located proximate to the wheel hub 142. For example, as described below, the wheel hub speed sensor 120 can be located adjacent to the transmission output shaft 140, which is in turn proximate to the wheel hub 142. The wheel hub speed sensor 120 can be configured so that it contacts the wheel hub 142. The wheel hub speed sensor 120 is configured to generate a wheel hub speed signal that facilitates determination of a rate and direction of rotation of the wheel hub 142.

An example of the wheel hub speed sensor 120 can be arranged proximate to the transmission output shaft 140 to determine the rate and rotation of the transmission output shaft 140, which can correspond to the rate and rotation of the wheel hub 142. For example, the wheel hub speed sensor 120 can correspond to a hall type of sensor that includes quadrature output sensors that facilitate determining both the rate of rotation and the direction of rotation of the transmission output shaft 140. In one example, a magnet can be arranged on the transmission output shaft 140 and sensed by the wheel hub speed sensor 120. This can facilitate sensing one 360 degree rotation of the transmission output shaft 140. In another example, the sensing resolution can be increased by arranging the wheel hub speed sensor 120 proximate to a gear that is coupled to the transmission output shaft 140. The wheel hub speed sensor 120 can sense the presence of a gear tooth in proximity to the wheel hub speed sensor 120, which can facilitate sensing an N/360 degree rotation of the transmission output shaft 140, where N corresponds to the number of teeth.

In another example, the wheel hub speed sensor 120 can be configured to detect the rotation of the transmission output shaft 140 optically. For example, a slotted disk (e.g., a disk with a group of concentrically arranged slots) can be arranged concentrically on the transmission output shaft 140. The wheel hub speed sensor 120 can include a light source and light sensor, and the slotted disk can be arranged between the light source and the light sensor. In this configuration, the wheel hub speed sensor 120 can sense an N/360 rotation of the transmission output shaft 140, where N corresponds to the number of slots.

FIG. 2 illustrates another example of a wheel hub speed sensor 120. Referring to FIG. 2, an example of the wheel hub 142 can include a ring gear 220. The wheel hub speed sensor 120 can include an idler gear 225 configured to mesh with the ring gear 220 of the wheel hub speed sensor 120 to facilitate determination of the rate and direction of rotation of the wheel hub 142. The wheel hub speed sensor 120 can correspond to a hall type of sensor that includes quadrature output sensors that facilitate determining both the rate of rotation and the direction of rotation of the idler gear 225. A magnet can be arranged on an idler gear shaft and sensed by the wheel hub speed sensor 120. This can facilitate sensing one 360 degree rotation of the idler gear 225. In this configuration, the size and/or the number of teeth on the idler gear 225 and the ring gear 220 can be configured so that when the ring gear 320 completes one rotation (i.e., one 360° rotation), the idler gear 225 completes multiple rotations such as multiple 360° rotations. This configuration can facilitate measuring, by the wheel speed sensor 120, the angle of rotation of the wheel hub 142 to within less than 1°, and in some examples to within 0.15°.

Returning to FIG. 1, the wheel hub speed signal generated by the wheel hub speed sensor 120 can correspond to a series of pulses, where each pulse represents an amount by which the wheel hub 142/transmission output shaft 140 rotates. For example, in the example above, where the wheel hub speed sensor 120 senses a magnet arranged on the transmission output shaft 140, a single pulse can indicate a 360 degree rotation. In the example, where the wheel hub speed sensor 120 senses the presence of a gear tooth in proximity to the wheel hub speed sensor 120, a single pulse can indicate an N/360 rotation of the transmission output shaft 140, where N corresponds to the number of teeth.

An example of the wheel hub speed signal can correspond to a digital signal in which a binary or hexadecimal value encodes the angle of rotation. The sign of the value can indicate the direction of rotation. Another example of the wheel hub speed signal can be an analog signal having a value (e.g., between 0 and 5 Volts) indicative of the angle of rotation and the direction of rotation.

Information generated by the wheel speed sensor 120 can be communicated to, for example, the controller 150 via one or more conductors. An example of the wheel speed sensor 120 can communicate information wirelessly. In this case, the wheel speed sensor 120 can include a battery that powers the wheel speed sensor 120, and that facilitates communicating information wirelessly. In another example, rotation of the shaft within the wheel speed sensor 120 can cause energy to be stored in, for example, a supercapacitor that can be provided in the wheel speed sensor 120. The stored energy can facilitate communicating the information wirelessly.

In some examples, the vehicle 100 can include a motor speed sensor 125. The motor speed sensor 125 can be arranged proximate to the motor output shaft 145. The motor speed sensor 125 can be configured to generate a motor output shaft speed signal that facilitates determination of a rate and direction of rotation of the motor output shaft 145. For example, the motor speed sensor 125 can correspond to a hall type of sensor that includes quadrature output sensors that facilitate determining both the rate of rotation and the direction of rotation of the motor output shaft 145. In one example, a magnet can be arranged on the motor output shaft 145 and sensed by the motor speed sensor 125. This can facilitate sensing one 360 degree rotation of the motor output shaft 145. In another example, the sensing resolution can be increased by arranging the motor speed sensor 125 proximate to a gear that is coupled to the motor output shaft 145. The motor speed sensor 125 can sense the presence of a gear tooth in proximity to the motor speed sensor 125, which can facilitate sensing an N/360 rotation of motor output shaft 145, where N corresponds to the number of teeth. In some examples, an optical sensor similar to the optical sensor described above can be utilized.

The steering control 135 can correspond to a user interface that facilitates steering the vehicle 100. For example, the steering control 135 can correspond to a pair of lap bars/levers, a steering wheel, a stick control, etc.

Figure 3:
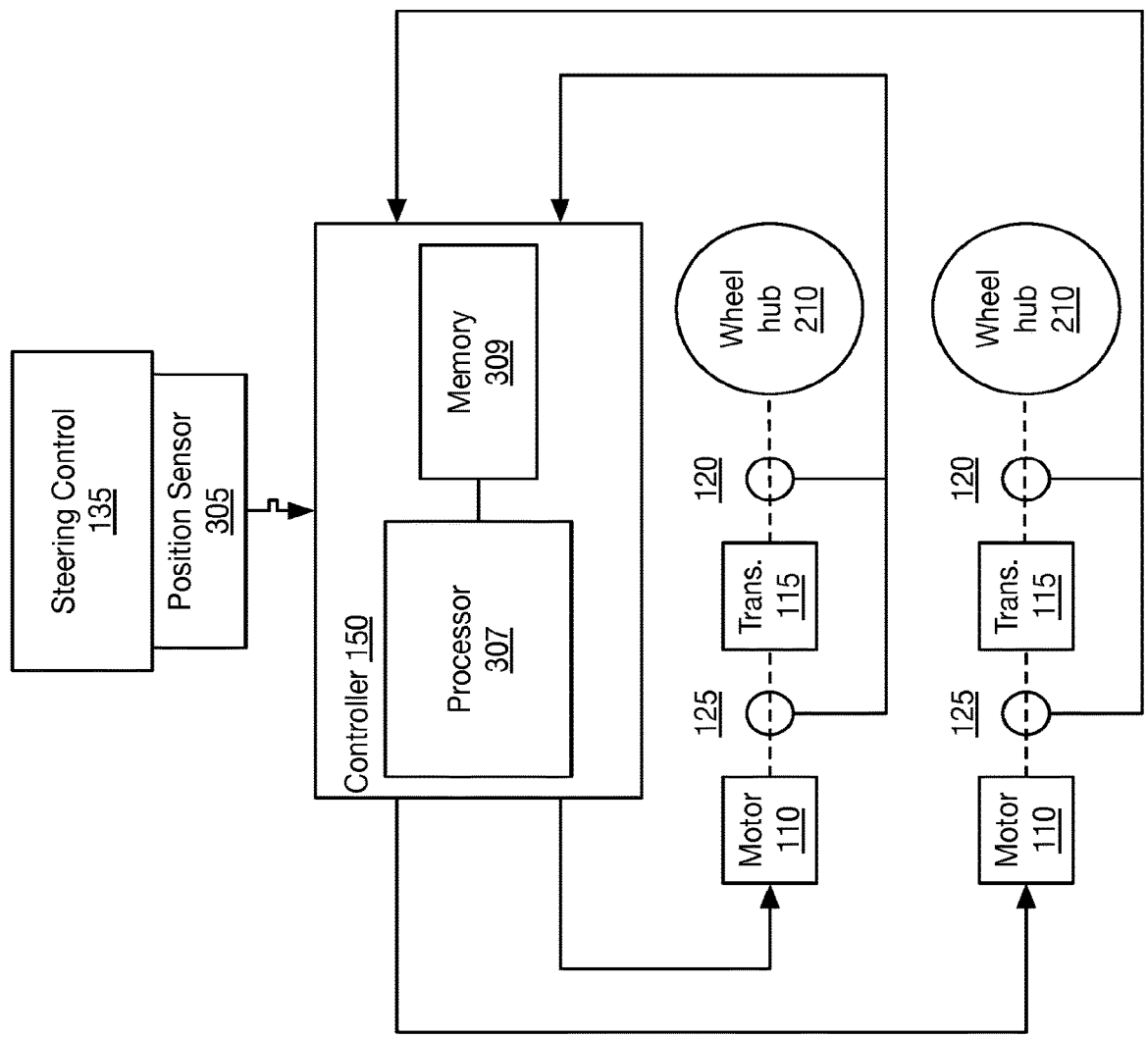
FIG. 3 illustrates a schematic diagram of the vehicle, in accordance with an example.

An example of the steering control 135 can include a position sensor (305, FIG. 3). The position sensor 305 can be configured to generate a position signal indicative of a position of the steering control 135.

The position signal can correspond to an analog signal that changes in proportion to the position of the steering control 135 or a digital signal that provides a numerical representation of the position of the steering control 135.

In the case of a steering wheel, the position sensor 305 can indicate the angle of rotation of the steering wheel. For example, in the analog signal case, the signal can be biased at a particular voltage greater than zero that indicates the steering wheel is centered. Voltages above and below that voltage can indicate a direction and an amount by which the steering wheel is turned. In the case of a digital signal, a value of zero can indicate that the steering wheel is centered. Values greater than or less than zero can indicate a direction and an amount by which the steering wheel is turned. The values generated by the analog and digital signals to convey the position of the steering wheel can be different.

In the case of a pair of lap bars/levers, a position sensor 305 can be provided for each lap bar. For example, in the analog signal case, the signal can be biased at a particular voltage greater than zero that indicates that the lap bar is centered. Voltages above and below that voltage can indicate a direction (forward or backward) and an amount by which the lap bar/lever is moved. In the case of a digital signal, a value of zero can indicate that the lap bar/lever is centered. Values greater than or less than zero can indicate a direction (forward or backward) and an amount by which the lap bar/lever is moved. The values generated by the analog and digital signals to convey the position of the lap bar/lever can be different.

The controller 150 is configured to communicate power to the motor assembly 105 to rotate the wheel hub 142 at a particular rate and in a particular direction. The particular rate and the particular direction are associated with a particular position of a plurality of positions of the steering control 135.

In some examples, power communicated to the motor 110 can be sourced from a battery. An example of the battery can correspond to a lithium-ion (Li-ion) battery. The Li-ion battery can include a group of cells electrically connected in series and/or parallel to provide the desired voltage and the desired capacity.

In other examples, power communicated to the motor 110 can be sourced from a combustion engine (not shown) that generates the power that drives the motor 110. In this regard, the combustion engine can drive an electric generator.

As noted above, the motor 110 can correspond to an induction motor that operates on an AC voltage. In this regard, the controller 150 can include an inverter circuit to convert DC voltage sourced from the battery or the generator to an AC voltage for powering the motor 110. The inverter circuit can be configured to control the output voltage to a particular AC voltage to thereby deliver a particular amount of power to the motor 110. The torque generated by the motor 110 can be proportional to the amount of power delivered to the motor 110.

FIG. 3 illustrates a schematic diagram of the vehicle 100. Referring to FIG. 3, the controller 150 is in communication with the position sensor 305 associated with the steering control 135 to receive a position signal indicative of the position of the steering control 135 from the position sensor 303.

The controller 150 can be in communication with wheel hub speed sensors 120 and motor speed sensors 125 to receive transmission output shaft speed signals and motor output shaft speed signals, respectively, associated with a pair of wheel hubs 142. The controller 150 can be configured to determine the rate and direction of rotation of respective transmission output shafts 140 and motor output shafts 145 associated with the pair of wheel hubs 142 based on the transmission output shaft speed signals and the motor output shaft speed signals, respectively.

The controller 150 can be configured to adjust the power delivered to the motors 110 based on the information indicative of the position of the steering control 135 and the transmission output shaft speed signals. In some examples, the controller 150 can be further configured to adjust the power delivered to the motors based on the motor output shaft speed signals.

An example of the controller 150 can include a processor 307 and a memory 309. An example of the controller 150 can include various peripheral components that facilitate receiving signals from and controlling components external to the controller 150. While a single controller 150 is illustrated, it is understood that there can be any number of controllers and that the operations described herein as being performed by the illustrated controller 150 can be distributed among the controllers. In this regard, the controller 150 can be configured to communicate information over a communication bus used by the other controllers such as an I2C bus or another suitable bus to coordinate activities performed by the other controllers.

The processor 307 can correspond to, for example, an ARM® based processor, an Intel® based processor, or can be based on a different technology. The memory 309 can correspond to a non-transitory data storage that includes instruction code. For example, the instruction code can include an operating system, such as Windows®, Linux®, or a different operating system. The memory 309 can be in communication with the processor 307, and the instruction code can be further executed by the processor 307 to cause the processor 307 to control various operations of the vehicle 100. Aspects of these operations are described in more detail below.

Figure 4:
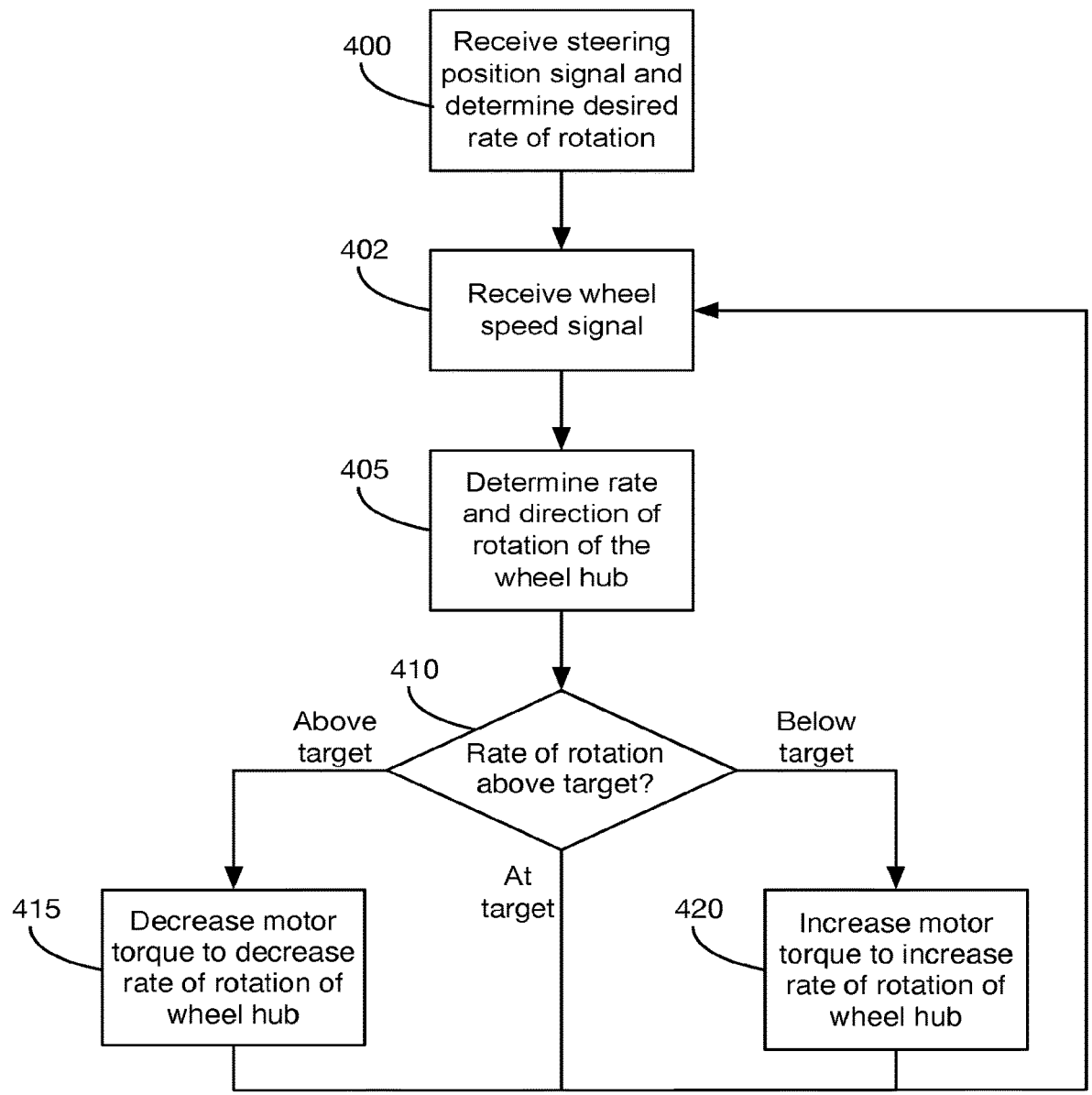
FIG. 4 illustrates operations performed by the controller for controlling the speed of the vehicle, in accordance with an example.

FIG. 4 illustrates examples of operations performed by the controller 150. In this regard, one or more of the operations can be implemented via instruction code, stored in the memory 309 of the controller 150, configured to cause the processor 307 of the controller 150 to perform the operations illustrated in the figures and discussed herein.

At operation 400, the controller 150 can receive a position signal indicative of a position of the steering control 135. The position signal can correspond to an analog signal that changes in proportion to the position of the steering control 135 or a digital signal that provides a numerical representation of the position of the steering control 135. In an example where the steering control corresponds to a steering wheel, the position signal can indicate the angle of rotation of the steering wheel. In an example where the steering control corresponds to a pair of lap bars/levers, the position signal can indicate a relative position between two extreme positions of each lap bar.

Next, the controller 150 can determine the desired rate of rotation based on the position signal. For example, the steering control 135 can be positionable between a first extreme and a second extreme. When positioned at a center position, the controller 150 can determine the desired rate of rotation to be zero. When positioned at the first extreme, the controller can determine the desired rate of rotation to be, for example, 100 revolutions/min in a first direction. When positioned at the second extreme, the controller 150 can determine the desired rate of rotation to be, for example, 100 revolutions/min in the opposite direction.

In some examples, the controller 150 can determine the desired rate of rotation as a linear function of the position of the steering control 135 between the first extreme and a second extreme. In this case, incremental movements of the steering control can result in corresponding incremental changes in the desired rate of rotation. For example, a 5% change in the position of the steering control can correspond to a 5% change in the desired rate of rotation.

In other examples, the controller 150 can determine the desired rate of rotation as a non-linear function of the position of the steering control 135 between the first extreme and a second extreme. For example, incremental movements of the steering control 135 near the center position of the steering control 135 can result in smaller incremental changes in the desired rate of rotation. Incremental movements of the steering control 135 near the extreme positions of the steering control 135 can result in larger incremental changes in the desired rate of rotation. For example, a 5% change in the position of the steering control 135 near the center position can correspond to a 1% change in the desired rate of rotation. A 5% change in the position of the steering control 135 near the extreme positions can correspond to a 10% change in the desired rate of rotation.

At operation 402, the controller 150 can receive a wheel hub speed signal. For example, the controller 150 can receive a wheel hub speed signal from the wheel hub speed sensor 120. The wheel hub speed signal can correspond to a series of pulses, where each pulse represents an amount by which the wheel hub 142 rotates. For example, in the example above where the wheel hub speed sensor 120 senses a magnet arranged on the transmission output shaft 140, a single pulse can indicate a 360 degree rotation. In the example where the wheel hub speed sensor 120 senses the presence of a gear tooth in proximity to the wheel hub speed sensor 120, a single pulse can indicate an N/360 rotation of the transmission output shaft 140, where N corresponds to the number of teeth.

At operation 405, the controller 150 can determine the rate and the direction of rotation of the wheel hub 142 based on the wheel hub speed signal. For example, the rate of rotation can be determined as the change in the angle of the wheel hub 142 per unit of time, such as 360 degree/sec. In an example, a moving average of the rate of rotation can be determined. For example, the average rate of rotation can be determined over one-second intervals or a different interval.

In the case of quadrature output sensors, the direction of rotation of the wheel hub 142 can be determined based on a pair of out-of-phase signals communicated from the quadrature output sensors. In this regard, the pair of out-of-phase signals can generate a first pattern when the wheel hub 142 rotates in a first direction and a second pattern when the wheel hub 142 rotates in the opposite direction.

At operation 410, if the determined rate of rotation is above the desired rate of rotation, then at operation 415, the controller 150 can decrease motor torque to decrease the rate of rotation of the wheel hub 142. For example, the controller can lower the AC voltage powering the motor 110 to decrease the amount of torque produced by the motor 110. An example of the controller 150 can implement proportional, integral, derivative (PID) control of the AC voltage to gradually lower the AC voltage to avoid abruptly changing the amount of torque produced by the motor 110. In this case, the controller 150 can gradually decrease the motor torque until the actual rate of rotation reaches the desired rate of rotation or until the actual rate of rotation falls within a range of the target rate of rotation, such as within 5% of the target rate of rotation.

If at operation 410, the determined rate of rotation is below the desired threshold, then at operation 420, the controller 150 can increase motor torque to increase the rate of rotation of the wheel hub 142. In this case, the controller can gradually increase motor torque until the actual rate of rotation reaches the desired rate of rotation or until the actual rate of rotation falls within a range of the target rate of rotation, such as within 5% of the target rate of rotation.

Figure 5:
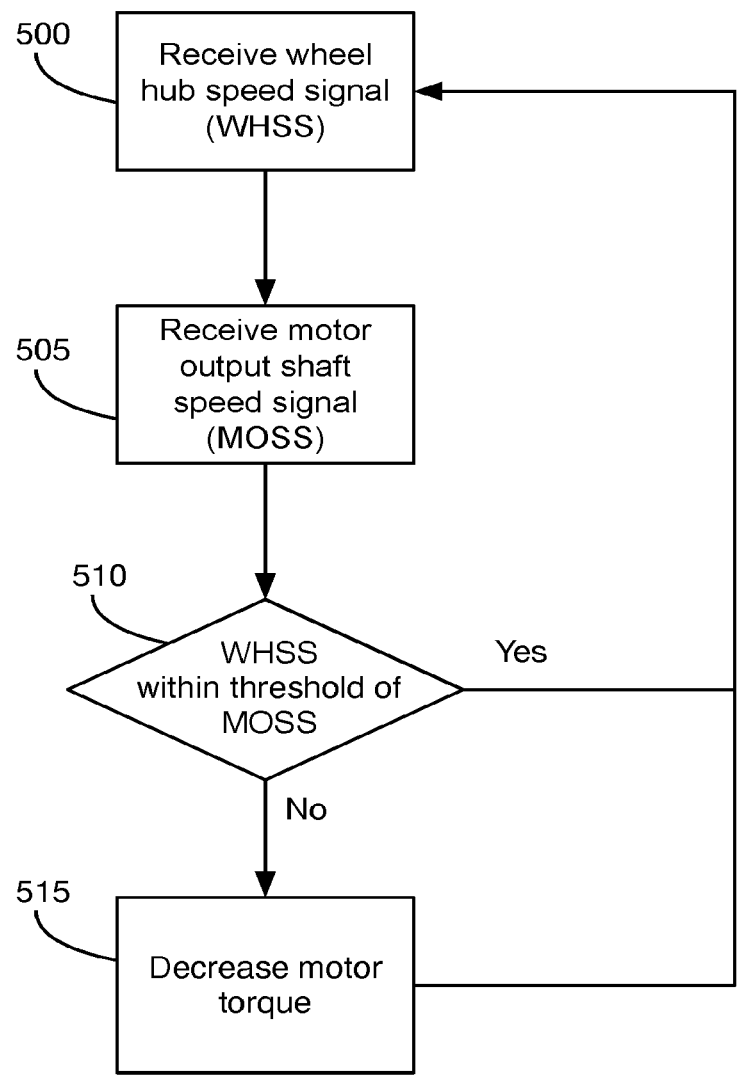
FIG. 5 illustrates operations performed by the controller for maintaining a rate of rotation ratio between a motor and transmission of the vehicle, in accordance with an example.

FIG. 5 illustrates examples of operations that can be performed by the controller when the vehicle 100 is equipped with both the wheel hub speed sensor 120 and the motor speed sensor 125. As noted above, the motor speed sensor 125 can be configured to generate a motor output shaft speed signal that facilitates determination of a rate and direction of rotation of the motor output shaft 145. In this regard, one or more of the operations can be implemented via instruction code, stored in the memory 309 of the controller 150, configured to cause the processor 307 of the controller 150 to perform the operations illustrated in the figures and discussed herein.

At operation 500, the controller 150 can receive the wheel hub speed signal. The wheel hub speed signal can facilitate determining, by the controller 150, the rate and direction of rotation of the wheel hub 142.

At operation 505, the controller 150 can receive the motor output shaft speed signal. The motor output shaft speed signal can facilitate determining, by the controller 150, the rate and direction of rotation of the motor output shaft 145.

At operation 510, the controller 150 can compare the determined rate and direction of rotation associated with the wheel hub and the motor output shaft.

If at operation 510, the controller 150 determines that the difference between the respective rotation rates of the wheel hub 142 and the motor output shaft 145 is beyond a threshold, then at operation 515, the controller 150 can decrease the torque of the motor 110.

For example, in some cases, the transmission 115 can become overheated, which can decrease the power transfer efficiency of the transmission 115. In some cases, gears within the transmission 115 can slip due to, for example, wear and tear on the components within the transmission 115. When either of these conditions occurs, the ratio of the rate of rotation of the transmission output shaft 140 to the rate of rotation of the motor output shaft 145 can decrease below a normal operating threshold. When this occurs (e.g., when the ratio is 5% below a normal operating ratio), the controller 150 can decrease the amount of power delivered to the motor 110 to lower the speed of the motor 110. This, in turn, can minimize and/or prevent damage to the motor assembly 105.

Figure 6:
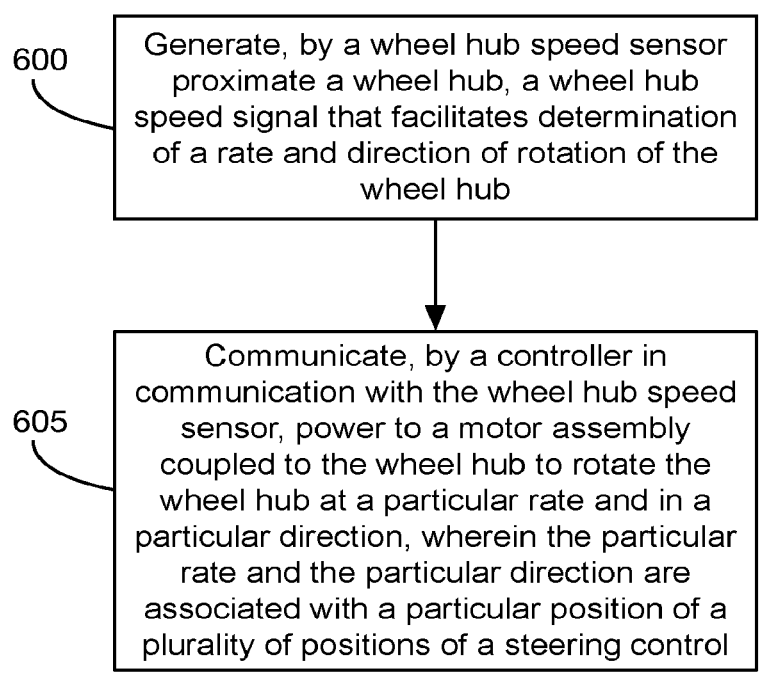
FIG. 6 illustrates a more detailed variation of FIG. 4, in accordance with an example.

FIG. 6 illustrates a more detailed variation of FIG. 5. Block 600 can involve generating, by a wheel hub speed sensor 120 proximate to a wheel hub 142, a wheel hub speed signal that facilitates determination of a rate and direction of rotation of the wheel hub 142.

Block 605 can involve communicating, by a controller 150 in communication with the wheel hub speed sensor 120, power to a motor assembly 105 coupled to the wheel hub 142 to rotate the wheel hub 142 at a particular rate and in a particular direction. The particular rate and the particular direction are associated with a particular position of a plurality of positions of a steering control 135.

In an example, the motor assembly 105 can include a motor 110 having a motor output shaft 145; a motor speed sensor 125 proximate to the motor output shaft 145 configured to generate a motor output shaft 145 speed signal that facilitates determination of a rate and direction of rotation of the motor output shaft 145; and a transmission 115 having a transmission output shaft 140. The transmission 115 can be configured to receive mechanical energy from the motor output shaft 145. The rate and direction of rotation of the wheel hub 142 matches a rate and direction of rotation of the transmission output shaft 140. In this example, the controller 150 can compare the rate and direction of rotation of the motor output shaft 145 with the rate and direction of rotation of the wheel hub 142. In response to the rate and direction of rotation of the motor output shaft 145 being within a threshold extent of the rate and direction of rotation of the wheel hub 142, the controller 150 can determine that the motor assembly 105 is operating properly. In response to the rate and direction of rotation of the motor output shaft 145 being beyond a threshold extent of the rate and direction of rotation of the wheel hub 142, the controller 150 can determine that the motor assembly 105 is operating improperly.

A further example can involve increasing, by the controller 150, the power to the motor 110 responsive to an increase in a load at the wheel hub 142 to thereby maintain a rate of rotation of the wheel hub 142.

In another example, the steering control 135 is positionable between a first extreme and a second extreme. This example can involve adjusting, by the controller 150, the rate of rotation of the wheel hub 142 as a non-linear function of a change in position of the steering control 135 between the first extreme and a second extreme.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A vehicle comprising:
a wheel hub configured to be coupled to a drive wheel;
a wheel hub speed sensor proximate to the wheel hub configured to generate a wheel hub speed signal that facilitates determination of a rate and direction of rotation of the wheel hub; and
a controller configured to communicate power to a motor assembly coupled to the wheel hub to rotate the wheel hub at a particular rate and in a particular direction, wherein the particular rate and the particular direction are associated with a particular position of a plurality of positions of a steering control and the wheel hub speed signal.

2. The vehicle according to claim 1, wherein the motor assembly comprises:
a motor having a motor output shaft;
a motor speed sensor proximate to the motor output shaft configured to generate a motor output shaft speed signal that facilitates determination of a rate and direction of rotation of the motor output shaft; and
a transmission having a transmission output shaft, wherein the transmission is configured to receive mechanical energy from the motor output shaft, and wherein the rate and direction of rotation of the wheel hub match a rate and direction of rotation of the transmission output shaft.

3. The vehicle according to claim 2, wherein the controller is configured to compare the rate and direction of rotation of the motor output shaft with the rate and direction of rotation of the wheel hub, wherein responsive to the rate and direction of rotation of the motor output shaft being within a threshold extent of the rate and direction of rotation of the wheel hub, determine that the motor assembly is operating properly, and responsive to the rate and direction of rotation of the motor output shaft being beyond a threshold extent of the rate and direction of rotation of the wheel hub, determine that the motor assembly is operating improperly.

4. The vehicle according to claim 3, wherein the controller is configured to decrease the power to the motor when the motor assembly is determined to be operating improperly.

5. The vehicle according to claim 2, wherein the controller is configured to increase the power to the motor responsive to an increase in a load at the wheel hub to thereby maintain a rate of rotation of the wheel hub.

6. The vehicle according to claim 2, wherein the motor is an electric motor.

7. The vehicle according to claim 1, wherein the steering control is positionable between a first extreme and a second extreme, wherein the controller is configured to adjust the rate of rotation of the wheel hub as a linear function of a position of the steering control between the first extreme and the second extreme.

8. The vehicle according to claim 1, wherein the steering control is positionable between a first extreme and a second extreme, wherein the controller is configured to adjust the rate of rotation of the wheel hub as a non-linear function of a change in position of the steering control between the first extreme and the second extreme.

9. The vehicle according to claim 1, further comprising:
a second motor assembly coupled to a second wheel hub;
a second wheel hub speed sensor proximate to the second wheel hub configured to generate a second wheel hub speed signal that facilitates determination of a rate and direction of rotation of the second wheel hub; and
wherein the controller is configured to communicate power to the second motor assembly to rotate the second wheel hub at a particular rate and in a particular direction, wherein the particular rate and in the particular direction are associated with a particular position of a plurality of positions of a second steering control.

10. A drive system for a vehicle comprising:
a motor assembly configured to be coupled to a wheel hub;
a wheel hub speed sensor configured to generate a wheel hub speed signal that facilitates determination of a rate and direction of rotation of the wheel hub; and
a controller configured to communicate power to the motor assembly, based on the wheel hub speed signal, to rotate the wheel hub at a particular rate and in a particular direction, wherein the particular rate and the particular direction are associated with a particular position of a plurality of positions of a steering control.

11. The drive system according to claim 10, wherein the motor assembly comprises:
a motor having a motor output shaft;
a motor speed sensor proximate to the motor output shaft configured to generate a motor output shaft speed signal that facilitates determination of a rate and direction of rotation of the motor output shaft; and
a transmission having a transmission output shaft, wherein the transmission is configured to receive mechanical energy from the motor output shaft, and wherein the rate and direction of rotation of the wheel hub match a rate and direction of rotation of the transmission output shaft.

12. The drive system according to claim 11, wherein the controller is configured to compare the rate and direction of rotation of the motor output shaft with the rate and direction of rotation of the wheel hub, wherein responsive to the rate and direction of rotation of the motor output shaft being within a threshold extent of the rate and direction of rotation of the wheel hub, determine that the motor assembly is operating properly, and responsive to the rate and direction of rotation of the motor output shaft being beyond a threshold extent of the rate and direction of rotation of the wheel hub, determine that the motor assembly is operating improperly.

13. The drive system according to claim 11, wherein the controller is configured to decrease the power to the motor when the motor assembly is determined to be operating improperly.

14. The drive system according to claim 11, wherein the controller is configured to increase the power to the motor responsive to an increase in a load at the wheel hub to thereby maintain a rate of rotation of the wheel hub.

15. The drive system according to claim 10, wherein the steering control is positionable between a first extreme and a second extreme, wherein the controller is configured to adjust the rate of rotation of the wheel hub as a linear function of a position of the steering control between the first extreme and the second extreme.

16. The drive system according to claim 10, wherein the steering control is positionable between a first extreme and a second extreme, wherein the controller is configured to adjust the rate of rotation of the wheel hub as a non-linear function of a change in position of the steering control between the first extreme and the second extreme.

17. A method for operating a vehicle, the method comprising:
- generating, by a wheel hub speed sensor proximate a wheel hub, a wheel hub speed signal that facilitates determination of a rate and direction of rotation of the wheel hub; and
- communicating, by a controller in communication with the wheel hub speed sensor, based on the wheel hub speed signal, power to a motor assembly coupled to the wheel hub to rotate the wheel hub at a particular rate and in a particular direction, wherein the particular rate and the particular direction are associated with a particular position of a plurality of positions of a steering control.

18. The method according to claim 17, wherein the motor assembly comprises:
- a motor having a motor output shaft;
- a motor speed sensor proximate to the motor output shaft configured to generate a motor output shaft speed signal that facilitates determination of a rate and direction of rotation of the motor output shaft; and
- a transmission having a transmission output shaft, wherein the transmission is configured to receive mechanical energy from the motor output shaft, and wherein the rate and direction of rotation of the wheel hub matches a rate and direction of rotation of the transmission output shaft, and wherein the method further comprises:
- comparing, by the controller, the rate and direction of rotation of the motor output shaft with the rate and direction of rotation of the wheel hub;
- responsive to the rate and direction of rotation of the motor output shaft being within a threshold extent of the rate and direction of rotation of the wheel hub, determining, by the controller, that the motor assembly is operating properly; and
- responsive to the rate and direction of rotation of the motor output shaft being beyond a threshold extent of the rate and direction of rotation of the wheel hub, determining, by the controller, that the motor assembly is operating improperly.

19. The method according to claim 18, further comprising increasing, by the controller, the power to the motor responsive to an increase in a load at the wheel hub to thereby maintain a rate of rotation of the wheel hub.

20. The method according to claim 17, wherein the steering control is positionable between a first extreme and a second extreme, wherein the method further comprises adjusting, by the controller, the rate of rotation of the wheel hub as a non-linear function of a change in position of the steering control between the first extreme and the second extreme.

* * * * *